UNITED STATES PATENT OFFICE.

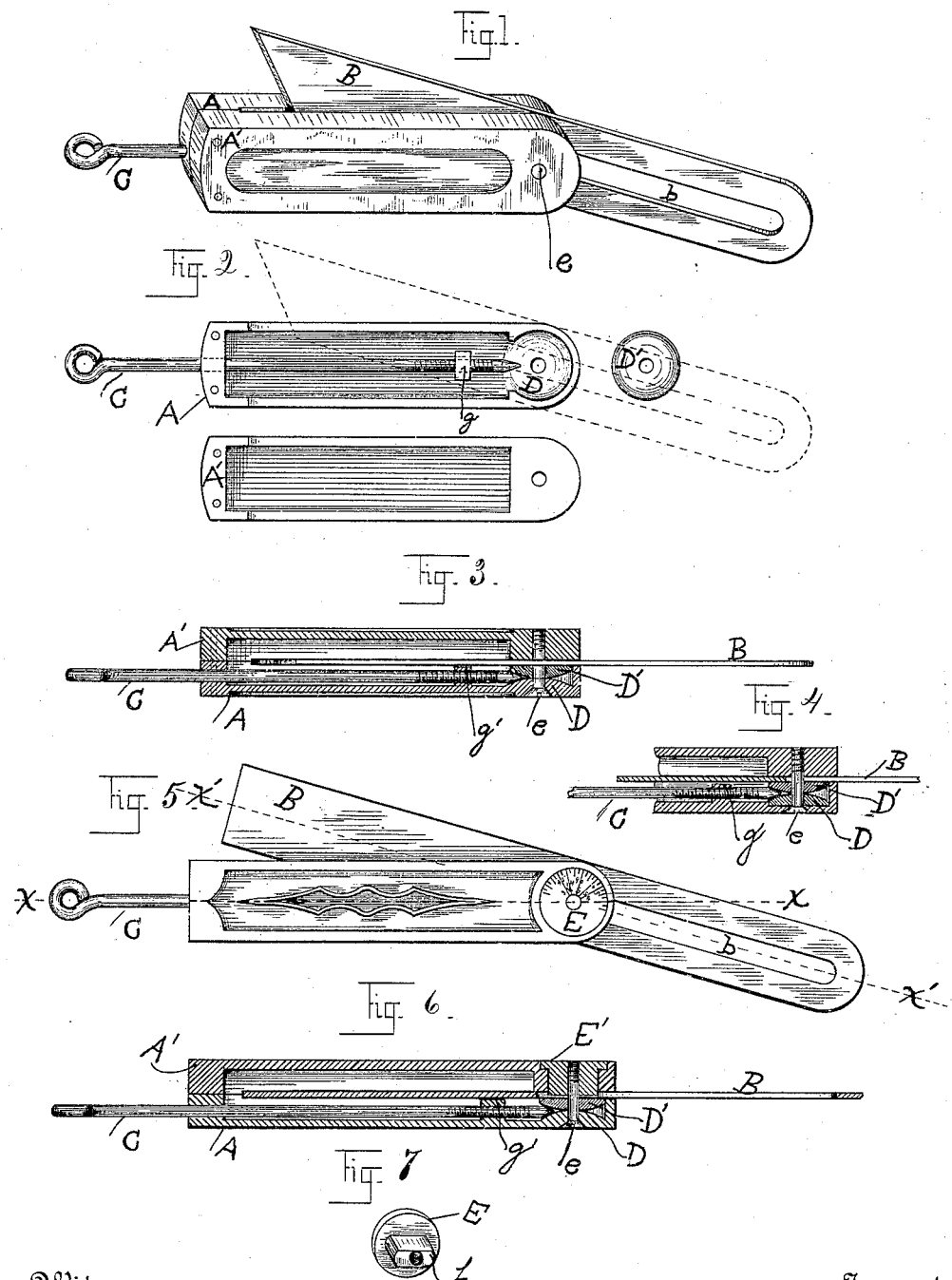

WILLIAM G. AVERY, OF CLEVELAND, OHIO, ASSIGNOR TO THE W. G. AVERY MANUFACTURING COMPANY, OF SAME PLACE.

BEVEL.

SPECIFICATION forming part of Letters Patent No. 408,368, dated August 6, 1889.

Application filed January 31, 1889. Serial No. 298,306. (No model.)

*To all whom it may concern:*

Be it known that I, WILLIAM G. AVERY, a citizen of the United States, residing in Cleveland, county of Cuyahoga, State of Ohio, have invented new and useful Improvements in Bevels; and I do declare the following to be a full, clear, and exact description of the same, reference being had to the accompanying drawings, forming part of this specification.

The object of my invention is to improve the means of locking the blade of a bevel so that it may be effectively secured at any required angle, and also to so improve the locking device as to prevent unnecessary wear of the parts, simplify its construction, and cheapen its manufacture. This object I accomplish by the novel construction, arrangement, and combination of parts, as shown and described herein, and specifically pointed out in the claims.

In the drawings, Figure 1 is a perspective view of a common bevel with my improvements added, and shows the projecting end of my screw wedge-rod C. Fig. 2 shows the two parts of the stock of a bevel with said rod C in one of them and the washers D and D'. Fig. 3 is a longitudinal section of my bevel cut through the center of its face, and shows one adaptation of my invention, which will be more fully explained hereinafter. Fig. 4 is a broken longitudinal section of a bevel and shows another adaptation of my invention, which is hereinafter more fully explained. Fig. 5 is a face elevation of a bevel with a dial-protractor. Fig. 6 is a longitudinal central section of a bevel having a dial-protractor and illustrating my invention. Fig. 7 shows the form of the dial-protractor represented in Figs. 5 and 6.

The stock of the bevel is made in two parts A and A', which are secured together at one end, leaving a space between said parts nearly the length of the stock for the blade. That part of the stock containing the rod C and the washers D and D' is necessarily chambered. The opposite part of the stock is not necessarily chambered, but is preferably so made, as it lightens the tool. A longitudinally-slotted blade B is pivoted between the parts of the stock by means of a screw e, which passes through the slot of the blade, as shown in the drawings. In that end of the stock which is secured together a rod enters and passes through a threaded hole in a lug g, placed at a convenient distance from the washers D and D'. The point of said rod C enters between the diverging faces of said washers. The rod is threaded at that point where it works in said lug, so as to screw through it, and is tapered at the end. Said washers D and D' may be segments of a sphere, or they may be the frustums of cones; but I prefer to make them segments of a sphere—*i. e.*, rounded on one side. A hole is bored through them at the center of their bases and at right angles therewith, through which will pass the screw e. The washers may be made of any kind of metal; but they are preferably made of brass. Said washers are placed in that part of the stock A which holds the rod C at the opposite end from where said rod enters, and they have their rounded faces together. The movable blade B works on top of said washers and against the opposite part of the stock. The lower washer D may be cast as a part of one part A of the stock, as shown in Figs. 3 and 6, or it may be a separate piece of metal, as shown in Fig. 4. I prefer to make the washer D separate from the stock, because if made stationary it is liable to wear in one place and become ineffective. If made of a separate piece, so that it may revolve around the screw e, the washer will wear evenly on its entire face, and if it should wear out a new one may replace the old washer at a trifling expense.

In a bevel having a dial-protractor, as shown by E of Fig. 5, the dial will have upon its under side an elongated lug f, which will fit into but pass not quite through the slot of the blade B, and the screw e will screw into said dial, as shown in Fig. 6.

In using my invention the blade B is adjusted to a required angle. The rod C is then screwed in, its point being forced between the rounded faces of the washers D and D'. As the washer D' is forced against the blade B, the blade is firmly held in place between said washer and the opposing part of the stock.

I am aware that Letters Patent of the

United States were granted to Smith and Duckworth December 5, 1882, No. 268,560, and August 14, 1883, No. 282,966, for improvements in combined tools; but neither of said patents covers my invention, nor are the inventions secured by said Letters Patent claimed herein.

Having fully described my invention, what I claim as new, and desire to secure by Letters Patent, is—

1. The combination of the chambered stock having within the chamber an elevated rounded surface D, and a lug $g$ within said chamber pierced and threaded to receive the rod C, and the slotted blade B, pivoted within one end of the stock, with the rounded washer D' within the stock and held in place by the pivot-screw $e$, and bearing its flat surface against the blade B and its rounded face opposing the rounded surface D of the stock, and said rod C adapted to have its inner end enter between said rounded surface D and the washer D', substantially as set forth.

2. The combination of the dial-protractor E, the chambered stock having an elevated rounded surface D and a lug $g$ within the chamber pierced and threaded to receive the rod C, and the slotted blade B, pivoted within one end of the stock, with the washer D' within the stock, rounded on one of its faces and held in place by the pivot-screw $e$, and bearing its flat surface against the blade B and its rounded face opposing the rounded surface D of the stock, and said rod C adapted to have its inner end enter between said rounded surface D and the washer D', substantially as set forth.

3. The combination, in a bevel, of the rod C, the washer D', having one face rounded, and the chambered stock provided with the rounded elevation D within the chamber, the inner end of said rod C being adapted to enter between said washer D' and the rounded surface D, substantially as set forth.

4. The combination, in a bevel, of the dial-protractor E, the rod C, and the washer D', rounded on one side, with the chambered stock having the rounded elevation D within the chamber, the inner end of the rod C being adapted to enter between said washer D' and the elevated rounded surface D, substantially as set forth.

WILLIAM G. AVERY.

Attest:
F. W. CADWELL,
E. E. STRANG.